April 14, 1959 L. A. SHIELD 2,882,091
COLLAPSIBLE COVER FOR VEHICLE BEDS
Filed Oct. 23, 1956 2 Sheets-Sheet 1

Inventor
Lawrence A. Shield
by W. Talbert Dick
Attorney

April 14, 1959 L. A. SHIELD 2,882,091
COLLAPSIBLE COVER FOR VEHICLE BEDS
Filed Oct. 23, 1956 2 Sheets-Sheet 2
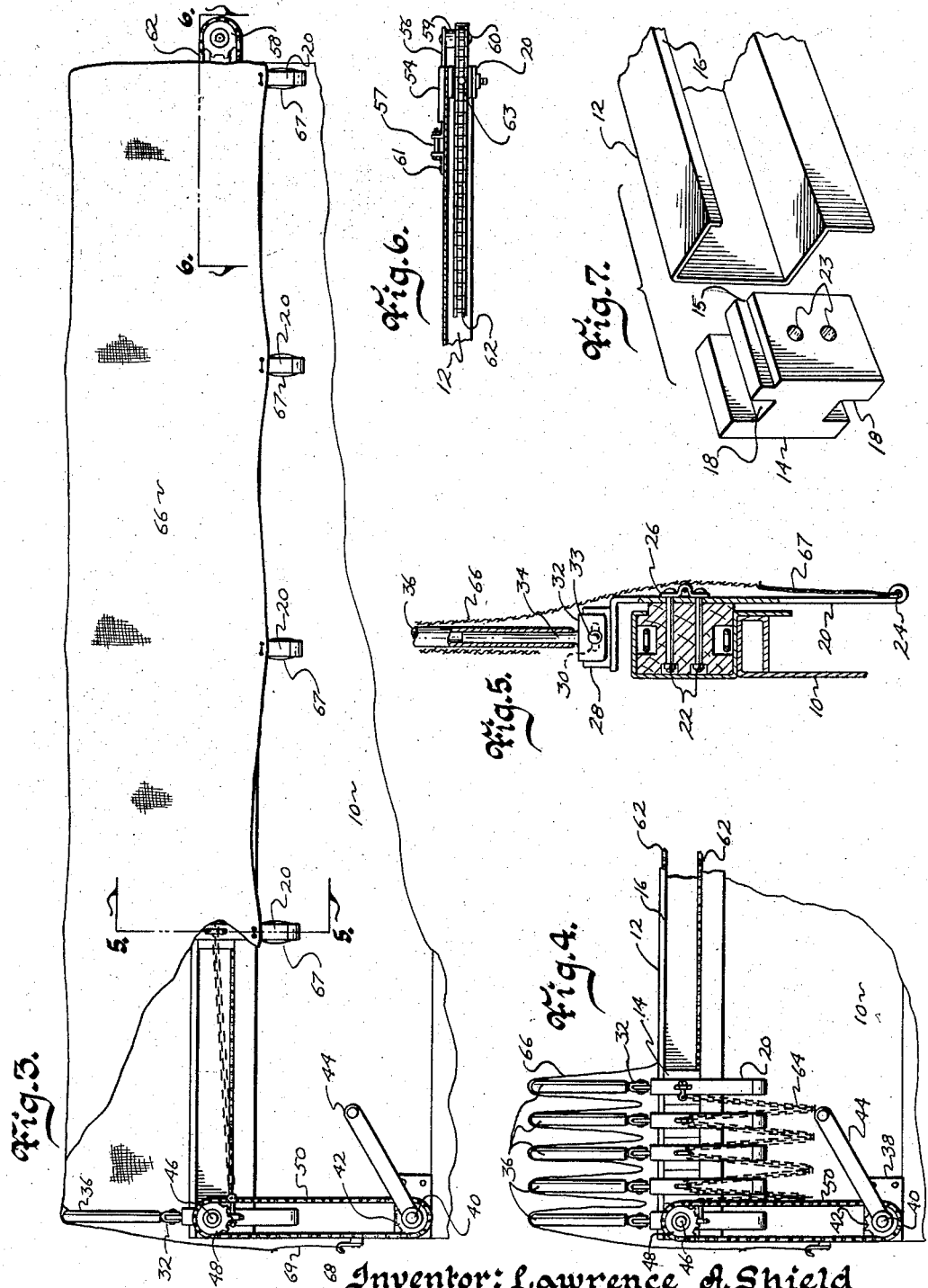
Witness
Edward P. Seeley
Inventor: Lawrence A. Shield
by M. Talbert Dick
Attorney

United States Patent Office 2,882,091
Patented Apr. 14, 1959

2,882,091

COLLAPSIBLE COVER FOR VEHICLE BEDS

Lawrence A. Shield, Reinbeck, Iowa

Application October 23, 1956, Serial No. 617,741

5 Claims. (Cl. 296—105)

This invention relates to collapsible covers for vehicles and, more particularly, to mechanical collapsible canopies for the open tops of vehicle boxes.

Truck and wagon beds have long been provided with various covering means, many of which have been of the removable variety. A great many problems arise when one has a vehicle bed which must intermittently be covered. One problem is where the cover can be stored while not in use. Another problem is that the installation of the cover is time consuming in that all the edges of the cover must be secured to the vehicle in some manner so that the air stream of the moving vehicle will not tear or otherwise damage the cover. And even those covers which do employ some mechanical means to get them in place must still have their edges lashed to the vehicle. Furthermore, the mechanical covers known to me have difficulty in covering only a portion of the vehicle bed when it is not desirable to have the whole bed covered and their generally expensive structure tends to bind in operation.

Therefore, the principal object of my invention is to provide a mechanical collapsible cover for vehicle beds that is easily installed and which can remain in an out of the way position even when not in use.

A further object of my invention is to provide a cover for vehicle beds which does not require that its edges be secured each time it is put into use.

A still further object of my invention is to provide a collapsible cover that will not bind while it be expanded or collapsed.

A still further object of my invention is to provide a collapsible cover whose vital structure can be adapted for use upon any vehicle bed, regardless of size.

A still further object of my invention is to provide a simple collapsible vehicle bed cover that is economical in manufacture, durable in use and refined in appearance.

These and other objects will be apparent to those skilled in the art.

Figure 1:
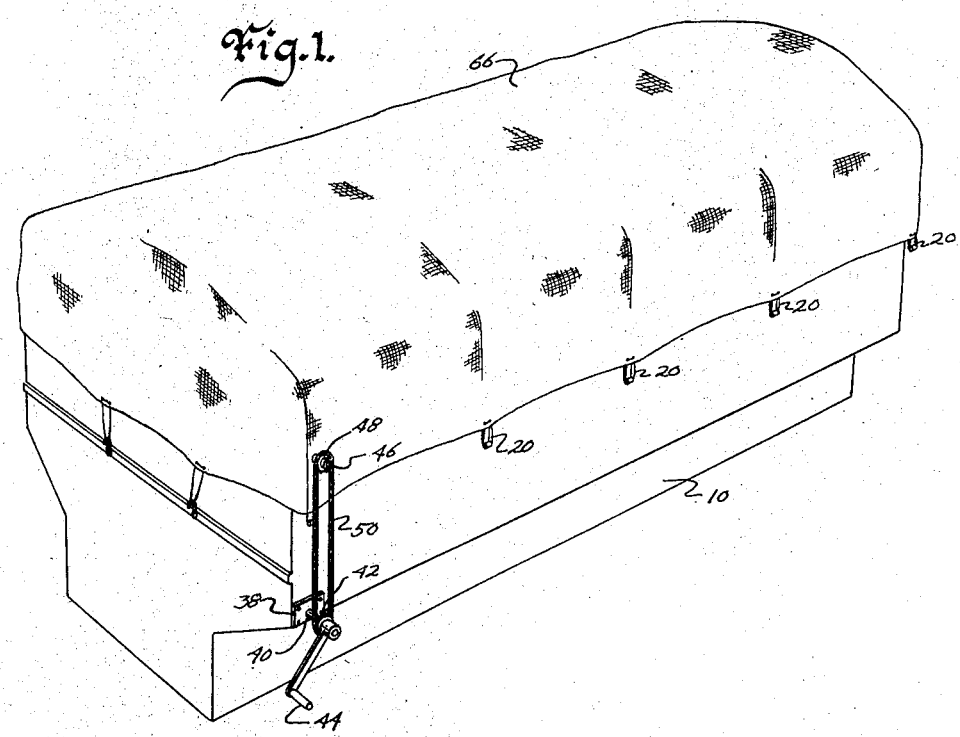
Figure 2:
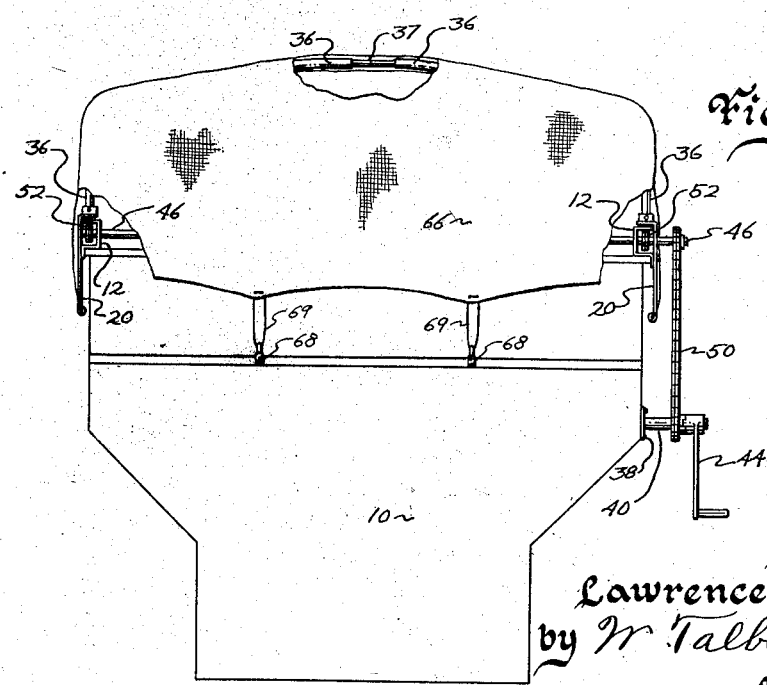

My invention consists in the construction, arrangement, and combination of the various parts of the device, whereby the objects contemplated are attained as hereinafter more fully set forth, specifically pointed out in my claims, and illustrated in the accompanying drawing in which:

Fig. 1 is a perspective view of a wagon box with my cover mounted on it,

Fig. 2 is a front elevational view of my cover mounted on a wagon box. A portion of the cover has been cut away to show the detailed structure of the carriers and rails, Fig. 3 is a side elevational view of my cover mounted on a wagon box. A portion of the cover has been cut away to more clearly show its detailed structure, Fig. 4 is a fragmentary elevational view of the front end of a wagon with my cover in its collapsed position, Fig. 5 is a sectional view taken on line 5—5 of Fig. 3 and shows the details of the carrier and rail secured to the side of the wagon, Fig. 6 is a sectional view taken on line 6—6 of Fig. 3 and shows the detailed structure of my cover at the rear of the wagon, and Fig. 7 is a perspective view of my rail and the block member which slides therein to hold the carrier member.

In these drawings I have used the numeral 10 to designate the open top box or bed of a wagon, truck, bus, train, automobile, or the like. On each side of the box, I secure a channel or V-shaped railing 12. Railing 12 can be secured to the side of box 10 in any convenient manner, such as by welding. The open end of U-shaped railing 12 is preferably extending outwardly from the side of the box. Block members 14 are slidably mounted within railing 12, and can be retained therein by having a notch 15 which slidably engages an overhanging bead flange 16 on the top of railing 12, as shown in Figs. 5 and 6. Block members 14 are of sufficient width to slightly protrude from the outside edge of railing 12, but otherwise, its outside surfaces generally corresponds to the interior shape of the railing. Slots 18 are disposed in the top and bottom of blocks 14 and are parallel to the longitudinal axis of railing 12. An inverted L-shaped carrier member 20 is secured to the outside face of each of the blocks 14 in any convenient manner such as by bolts 22 which extend through the transverse holes 23 in each of the blocks. As shown in Fig. 5, bolts 22 terminate within holes 23 at a point short of the inside face of the block 14. This, of course, is to prevent the bolts from interfering with the blocks sliding within railing 12. The carrier members 20 are secured to the blocks at a point so that a portion of their length extends both above and below the blocks 14 and railing 12. The lower end of the carriers can be folded back upon itself to form hollow bead 24. A clip member 26 with an opening therein can be mounted on the outside of carrier 20 and held in place by bolts 22. Carriers 20 have a lug member 28 extending transversely across their upper flanges. These lug members 28 have an elongated horizontal slot 30 disposed therein as shown by the dotted lines in Fig. 5. A U-shaped bearing member 32 is slidably mounted upon each of lugs 28 and is secured thereto by pin 33 which extends through bearing member 32 and slot 30. A vertical post 34 is rigidly secured to the upper portion of each bearing member 32. A hollow arch member 36 is telescopically rotatably mounted on each of the posts 34, and these arch members extend over the wagon box and are joined into pairs, as shown in Fig. 2, by rod 37 which telescopes into each of the protruding ends of two mating arch members 36.

As is evident at this point, each side of the wagon box is equipped with a railing 12 and an equal number of carriers 20 with related structure. On one side of the wagon box 10, and at its front end, I have disposed bearing member 38 from which shaft member 40 is perpendicularly rotatably extending. Sprocket wheel 42 is rigidly secured to shaft 40, and crank 44 is detachably secured to the shaft to facilitate the rotation thereof at times. A second shaft 46 is rotatably mounted in the forward ends of railings 12, as shown in Fig. 2. One end of shaft 46 protrudes out over shaft 40 and a sprocket wheel 48 is rigidly secured to this protruding end of shaft 46. Sprocket wheel 48 dwells in the same vertical plane as does sprocket wheel 42 on shaft 40. Link chain 50 extends between sprocket wheels 42 and 48 so that the rotation of shaft 40 will result in similar movement of shaft 46.

Sprocket wheels 52 are rigidly secured to shaft 46 at a point inside each of the two railing members 12. This structure is clearly shown in Fig. 2. By referring to Fig. 6, it can be seen that an elongated clip means 54 is rigidly secured to the inside face or back of railing 12 at its rearward end. A bearing bar 56 is slidably supported within clip 54 and has a sprocket wheel 58 rotatably secured to its rearward end by means of shaft 59 and pin 60. A clip angle 61 is secured to the back of the railing 12 at a point forward of bearing bar 56. A threaded nut and bolt assembly 57 connect the clip angle 61 and bearing bar 56. This structure, as shown in Fig. 6, appears on the rearward end of each of the railing members 12.

A link chain 62 is threaded about sprocket wheels 58 on the rear of railings 12 and the sprocket wheels 52 at the forward ends of the railings. Chain 62 avoids interference with blocks 14 by extending through the slots 18 in the top and bottom of the blocks. This structure is clearly shown in Fig. 5. The rearmost carrier 20 on each railing 12 is secured to chain 62 by pin 63 as illustrated in Fig. 6. A chain 64 is connected to each of the carriers 20 by means of clips 26 at points equally spaced along its length. A canvas cover 66 is adapted to fit over arch members 36 and to extend down below railings 12 to be secured to the eyelet 24 on the lower end of each carrier. Cover 66 is secured to eyelets 24 in any convenient manner, such as by twine members 67. The front of cover 66 can be similarly secured to the front of the wagon 10 by means of clips 68 and twine members 69.

The normal operation of my device is as follows: Upon installation, my cover will very likely be in the collapsed position shown in Fig. 4. The crank 44 is then placed on shaft 40 and rotated in a clockwise direction, as seen in Fig. 4. This rotation of shaft 40 will in turn rotate shaft 46 and chain 62. The clockwise rotation of chain 62 will start to slide the rearmost carrier 20 within the railing 12 towards the rear of the wagon. When a length of the chain 64 becomes tightened between the two rearmost carriers 20, the second carrier will start to slide rearwardly within railing 12. This process continues until my collapsible cover assumes the position shown in Figs. 1 and 3. To close or collapse my cover, the operation is simply reversed by rotating crank 44 in a counterclockwise direction. Thus, the rearmost carrier will begin to slide forwardly and will carry the succeeding carriers with it as the succeeding carriers are encountered along the railing.

It should be noted that the simplicity of my railing members 12 will permit their installation on vehicles of many types. Furthermore, the cooperating effect of the expansion joint formed between two arch members 36 by rod 37 and slidably mounted post members 34 which support the arch members, will permit my cover to be placed on vehicle beds of different size and will also permit the expansion of a loaded vehicle without adverse effect. It should be noted further that since sprocket wheel 58 is slidably adjustable with respect to railing 12 by virtue of the structure shown in Fig. 6, the tension in chain 62 can be adjusted whenever desired.

From the foregoing, it will be seen that my invention provides a mechanical collapsible cover for vehicle beds that is easily installed and which can remain in an out of the way position even when not in use. It has been shown that my vehicle cover does not require that its edges be secured each time it is put into use, and that it will not bind while being expanded or collapsed. And the above described cover can be installed upon any vehicle bed, regardless of size. Therefore, it is seen that the stated objects of my invention have been accomplished.

Some changes may be made in the construction and arrangement of my collapsible cover for vehicle beds without departing from the real spirit and purpose of my invention, and it is my intention to cover by my claims, any modified forms of structure or use of mechanical equivalents which may be reasonably included within their scope.

I claim:

1. In a collapsible canopy for open top vehicle beds, a pair of U-shaped railings adapted to be secured upon the top side portions of a vehicle bed, respectively; a sprocket wheel rotatably secured to each end of each railing with one pair of sprocket wheels on corresponding ends of said railings being operatively connected to each other, a plurality of block members slidably secured within each of said railings, said blocks having at least two spaced apart slots therein, a carrier member secured to each of said blocks, said carrier members on each railing being connected by lengths of flexible material, a link chain extending between the two sprocket wheels on each of said railings and extending through the slots in said blocks, said link chains each being operatively connected to the block members at one end of each of said railings, a plurality of arch members operatively secured by their ends to a corresponding carrier member on each of said railings, a cover member supported on said arch members, and means for rotating the operatively connected pair of sprocket wheels.

2. In a collapsible canopy for open top vehicle beds, a pair of U-shaped railings adapted to be secured upon the top side portions of a vehicle bed, respectively; a sprocket wheel rotatably secured to each end of each railing with one pair of sprocket wheels on corresponding ends of said railings being operatively connected to each other, a plurality of block members slidably secured within each of said railings by having the top outer marginal edge of each of said railings extending downwardly, said blocks having at least two spaced apart slots therein, a carrier member secured to each of said blocks, said carrier members on each railing being connected by lengths of flexible material, a link chain extending between the two sprocket wheels on each of said railings and extending through the slots in said blocks, said link chains each being operatively connected to the block members at one end of each of said railings, a plurality of arch members operatively secured by their ends to a corresponding carrier member on each of said railings, a cover member supported on said arch members, and means for rotating the operatively connected pair of sprocket wheels.

3. In a collapsible canopy for open top vehicle beds, a pair of U-shaped railings adapted to be secured upon the top side portions of a vehicle bed, respectively; a sprocket wheel rotatably secured to each end of each railing with one pair of sprocket wheels on corresponding ends of said railings being operatively connected to each other, a plurality of block members slidably secured within each of said railings by having the top outer marginal edge of each of said railings extending downwardly, said blocks having at least two spaced apart slots therein, a carrier member secured to each of said blocks, said carrier members on each railing being connected by lengths of flexible material, a link chain extending between the two sprocket wheels on each of said railings and extending through the slots in said blocks, said link chains each being operatively connected to the block members at one end of each of said railings, a plurality of arch members operatively secured by their ends to a corresponding carrier member on each of said railings, a cover member supported on said arch members, and means for rotating the operatively connected pair of sprocket wheels; said railings each having the width of its top less than the width of its bottom.

4. In a collapsible canopy for open top vehicle beds, a pair of U-shaped railings adapted to be secured upon the top side portions of a vehicle bed, respectively; each of said railings in cross section extending first upwardly, then laterally inwardly, then upwardly, then laterally outwardly and then downwardly, a sprocket wheel rotatably secured to each end of each railing with one pair of sprocket wheels on corresponding ends of said railings being operatively connected to each other, a plurality of block members slidably secured within each of said railings, said blocks having at least two spaced apart slots therein, a carrier member secured to each of said blocks, said carrier members on each railing being connected by lengths of flexible material, a link chain extending between the two sprocket wheels on each of said railings and extending through the slots in said blocks, said link chains each being operatively connected to the block members at one end of each of said railings, a plurality of arch members operatively secured by their ends to a corresponding carrier member on each of said railings, a cover member supported on said arch members, and means for rotating the operatively connected pair of sprocket wheels.

5. In a collapsible canopy for open top vehicle beds, a pair of U-shaped railings adapted to be secured upon the top side portions of a vehicle bed, respectively; each of said railings in cross section extending first upwardly, then laterally inwardly, then upwardly, then laterally outwardly and then downwardly, a sprocket wheel rotatably secured to each end of each railing with one pair of sprocket wheels on corresponding ends of said railings being operatively connected to each other, a plurality of block members slidably secured within each of said railings, said blocks having at least two spaced apart slots therein, a carrier member secured to each of said blocks, said carrier members on each railing being connected by lengths of flexible material, a link chain extending between the two sprocket wheels on each of said railings and extending through the slots in said blocks, said link chains each being operatively connected to the block members at one end of each of said railings, a plurality of arch members operatively secured by their ends to a corresponding carrier member on each of said railings, a cover member supported on said arch members, and means for rotating the operatively connected pair of sprocket wheels, said blocks each having a cut away portion in its outer top edge to accommodate the downwardly extending portion of the railing in which it is slidably mounted.

References Cited in the file of this patent
UNITED STATES PATENTS

| | | |
|---|---|---|
| 905,571 | Pangborn | Dec. 1, 1908 |
| 1,263,759 | Hanaway | Apr. 23, 1918 |
| 1,376,250 | Camp | Apr. 26, 1921 |
| 2,469,958 | Fowler | May 10, 1949 |
| 2,565,746 | Turner | Aug. 28, 1951 |
| 2,774,623 | Owen | Dec. 18, 1956 |

FOREIGN PATENTS

| | | |
|---|---|---|
| 22,242 | Great Britain | 1908 |
| 313,379 | Great Britain | June 13, 1929 |
| 728,051 | Great Britain | Apr. 13, 1953 |